United States Patent Office 3,196,102
Patented July 20, 1965

3,196,102
PREPARATION OF METAL DEACTIVATOR
FROM PETROLEUM DISTILLATES
Ivor W. Mills, Glenolden, and John J. Melchiore, Wallingford, Pa., assignors to Sun Oil Company, Philadelphia, Pa., a corporation of New Jersey
No Drawing. Filed June 19, 1963, Ser. No. 288,913
9 Claims. (Cl. 208—46)

This invention relates to the preparation of a metal deactivator from petroleum distillate oils. More particularly the invention concerns the preparation and concentration of a material from petroleum distillates that boil above 400° F., which material is capable of complexing with copper that may be present in small amount in mineral oils and thus nullifying the catalytic effect of the copper in promoting oxidation of the oil.

It is well known that the presence of copper in petroleum distillates can have an adverse effect on oxidation stability of the hydrocarbons during use. Certain oils, such as transformer oils, cable oils, refrigerator oils and the like, are normally used in systems in which copper is present, and the copper can have a pronounced effect in accelerating deterioration of the oil through oxidation. Other petroleum distillates, while not necessarily being intended for use in copper-containing systems, often contain deleterious amounts of copper due to contact with copper-containing equipment during processing and subsequent handling. Thus copper can be present in sufficient amount to promote oxidation and result in gum or sludge formation in such distillates as gasoline, kerosene, furnace oils, diesel oils and lubricating oils. The accelerated oxidation of these products may give rise to sludging in storage tanks, clogging of filters or nozzles, corrosion of equipment, loss of desirable product qualities such as dielectric strength, and other undesirable effects.

The present invention provides a method for making a material capable of complexing with soluble copper in hydrocarbon oils and thereby passivating or inactivating its prooxidative character. This material can be made from petroleum distillates boiling above 400° F. While its chemical constitution is not fully understood at present, it evidently is a derivative of certain types of constituents, such as sulfur compounds, that naturally occur in petroleum distillates in small amounts. The present method involves the formation of such derivative in situ in the distillate oil and thereafter concentrating it in the manner hereinafter described. The resulting concentrate of copper deactivator can then be added in a suitable small amount to any of the various types of petroleum distillates referred to above to negative the action of copper in accelerating oxidation.

According to the invention a copper deactivator is prepared by contacting a petroleum distillate oil boiling above 400° F. with alkali metal alkoxide in which the alkali metal is sodium or potassium or both and the alkoxide moiety corresponds to an aliphatic or cycloaliphatic secondary or tertiary alcohol having 3–10 carbon atoms. The alkali metal alkoxide reacts with the oil to produce a compound or compounds capable of forming a complex with oil-solubilized copper. Following treatment of the oil with the alkoxide, an organic copper salt which is soluble in the oil is added thereto to form a complex with the metal deactivating agent and the mixture is distilled to remove a major portion of the oil as distillate, thus leaving the complex in concentrated form in the residue oil. The latter is then treated with an aqueous mineral acid, such as hydrochloric or sulfuric acid. This treatment breaks the complex and extracts the copper as a water-soluble salt, thus leaving the deactivating agent in the oil phase. By separating the aqueous phase and water washing to remove residual mineral acid from the oil phase, a concentrate of deactivator in the residue oil is obtained which can thereafter be blended in minor amount in distillate oils subject to contamination by copper. Presence of the deactivator in the distillate oil enhances the latter's oxidation stability in the presence of copper.

Any petroleum distillate fraction boiling above 400° F. can be used for making the copper deactivator in accordance with the invention. However, best results generally are obtained by using a naphthenic distillate boiling mainly in the range of 550–700° F. Such distillates generally have a viscosity in the range of 50–65 S.U.S. at 100° F. and a viscosity-gravity constant in the range of 0.84–0.92. Preferably the distillate stock used is treated with concentrated sulfuric acid and then with adsorptive clay prior to reacting it with the alkali metal alkoxide to produce the metal deactivator component. For this purpose 20 lbs./bbl. of 98% sulfuric acid and 35 lbs./bbl. of adsorptive clay typically can be used.

The alkoxide used in practicing the present invention must be derived from an alcohol which is either a secondary or tertiary alcohol, as primary alcohols are not operative for the present purpose. It is permissible for the alcohol to be a diol or triol provided that at least one of the hydroxyl groups is either secondary or tertiary. The alcohol can be either aliphatic or cycloaliphatic. In the latter case the alcohol preferably is tertiary. The preferred alcohols are isopropanol and tertiary butanol, but other alcohols of the $C_3$–$C_{10}$ range which are either secondary or tertiary are suitable. Examples are isopropanol, 2-butanol, tertiary butanol, 3-methyl-2-butanol, tertiary pentanol, 2-hexanol, 3-hexanol, 3-ethyl-3-pentanol, 2,2,3-trimethyl-4-pentanol, 2,4-dimethyl-3-ethyl-4-hexanol, cyclohexanol, 1-methylcyclopentanol, 1,3-dimethylcyclohexanol and the like.

In carrying out the process the alkoxide can be formed in situ in the oil to be treated by adding the alkali metal and an alcohol as described above or it can be pre-formed before addition to the oil. In either of these embodiments, the amount of alkali metal present in the alkoxide should be in the range of 0.1–5.0% by weight on the oil and more preferably 0.3–2.5%. When a pre-formed alkoxide is employed, it can be used either with or without excess alcohol. In the embodiment where the alkoxide is formed in situ in the oil to be treated by adding the alkali metal and alcohol separately, the molar ratio of alcohol to alkali metal preferably should be at least 1:1 so that all of the alkali metal will be converted to the alkoxide. Free alkali metal is not itself effective for producing a copper deactivating agent and hence the presence of excess alkali metal would offer no benefit and would increase the cost of the treatment. For purpose of description the alkali metal will hereinafter be referred to as sodium since it is preferred to potassium in view of its lower cost.

Practice of the process by separately adding the sodium and alcohol and forming the alkoxide in situ in the oil is preferred, since this avoids a separate step of pre-forming the alkoxide. In this embodiment it is desirable to contact the oil, sodium and alcohol utilizing vigorous agitation sufficient to disperse the metal in finely divided form so that it can readily react with the alcohol to produce the sodium alkoxide. Temperatures from below room temperature (e.g., 50° F.) up to the cracking temperature of the oil can be used, but temperatures below 500° F. generally should be employed and it is preferable to use a temperature considerably below 500° F., e.g., temperatures in the range of 175–400° F. In practicing this embodiment of the process when the temperature is above the boiling point of the alcohol used, the reaction should be carried out either under pressure or with a reflux condenser attached to the reactor in order to prevent loss of alcohol from the system.

The reaction of the sodium, alcohol and the oil components is exothermic and an immediate rise in temperature will be noted when the alcohol, sodium and oil are intimately admixed. Contacting of the mixture is continued until the reaction is complete as indicated by no further release of heat. The time of contact will vary depending upon such factors as the nature of the charge oil, reaction temperature, degree of dispersion of the sodium and the like; but it generally will be in the range of 5 minutes to 3 hours.

In the embodiment employing pre-formed alkoxide, the reagent conveniently can be prepared by finely dispersing sodium in a small amount of the oil to be treated preferably at a temperature above the melting point of the sodium, and reacting the dispersion with the alcohol. The so-prepared reagent generally is in the form of a slurry of the alkoxide in the oil. This can be added to the oil to be treated in amount such that the sodium content is 0.1–5.0% by weight based on the oil and more preferably 0.3–2.5% by weight. The mixture can be reacted at any desired temperature in the range of 50–500° F. but preferably a temperature in the range of 175–400° F. is utilized. In this case a temperature rise during the reaction is not particularly evident as it is in the other embodiment of the invention. A reaction time of the order of 5 minutes to 3 hours should be allowed depending upon the temperature employed. In this embodiment of the invention, the reactor need not be maintained under pressure or be provided with a reflux condenser to prevent escape of alcohol.

Following the treatment of the oil with the sodium alkoxide as described above, metal components can, if desired, be removed from the reaction mixture by settling, centrifugation or filtering. Also if desired the oil can be washed with water and treated with adsorptive clay to insure removal of all the metal components. However such removal of the metal components is not essential for practicing the invention, as they will be removed along with copper in the hereinafter described step of treating the residual oil fraction with mineral acid.

The next step in the process involves the addition of a minor amount of a cupric or cuprous salt of an organic acid to the oil to form a complex with the metal deactivating agent that was formed during the alkoxide treatment. For this purpose any oil-soluble organic copper salt can be used. Examples of suitable salts are copper oleate, copper stearate, copper naphthenate, copper benzoate and copper naphthoate. Only a small amount of the salt need be employed, for example, an amount such that the copper content of the oil is in the range of 10–100 p.p.m. After the copper salt has been added, the mixture is then distilled, generally under vacuum, to remove a major portion of the oil overhead. Typically 80% to 95% of the oil is distilled from the mixture. The metal deactivating agent remains in the residue fraction in the form of its complex with copper.

Following the distillation the residue fraction is treated with aqueous mineral acid such as hydrochloric or sulfuric acid to extract the copper from the complex. The aqueous acid phase is then separated from the oil phase and the latter is washed with water or dilute alkali to insure removal of all the mineral acid. It is generally desirable to treat the oil phase, which contains the metal deactivator, with adsorptive clay to remove color bodies which may be formed during the distillation. This clay treatment does not remove the metal deactivating agent.

While the amount of the effective deactivating agent present in the residual oil prepared as described above is relatively small, the residual oil in effect constitutes a concentrate of the deactivating agent as compared to the whole oil after treatment with the sodium alkoxide. This concentrate can be added in minor amounts to various distillate oils to protect them against the pro-oxidative catalytic action of more or less trace amounts of copper.

The effectiveness of the copper deactivating agent in preventing oxidation of oils promoted by copper can conveniently be determined in an oxidation test developed by the Doble Engineering Company of Belmont, Mass., and known as the Power Factor Valued Oxidation (PFVO). It involves carrying out an oxidation of the oil by the procedure described in "ASTM Standards on Electrical Insulating Liquids and Gases," pages 307–313, December 1959, under the title, "Suggested Method of Test for Oxidation Characteristics of Mineral Transformer Oil." This procedure involves bubbling air through a known amount of the oil held at a temperature of 95° C. in the presence of copper and iron. The PFVO Test is done by determining the power factor of the oil at intervals throughout the oxidation period. As the oil deteriorates through oxidation the power factor of the oil tends to increase. This test is referred to in the following examples which are illustrative of the invention.

*Example I*

The charge oil was a naphthenic distillate stock of boiling range suitable for electrical transformer use. The oil initially had the following properties: A.P.I. gravity=24.4; flash point=280° F.; fire point=310° F.; S.U.S. viscosity @ 100° F.=55.3; S.U.S. viscosity @ 210° F.=33.6; nitrogen content=50 p.p.m.; sulfur content=0.18%; refractive index=1.5009.

The charge oil was first treated with 99% sulfuric acid in amount of 20 lbs./bbl. followed by 2 lbs./bbl. of coagulation clay to remove reaction products, and then was neutralized with caustic soda, water washed and air dried. A 50 gal. batch of the oil was charged to a pressure reactor provided with a high speed stirrer and 0.5% by weight of sodium was added and dispersed therein by vigorous agitation. Isopropanol was added in amount such that the molar ratio of the alcohol to sodium was 1.1:1 and the mixture was stirred vigorously at a temperature of about 175° F. for 35 minutes to effect complete reaction of the sodium and alcohol. The mixture was then heated to 280° F. and stirred for an additional 35 minutes to complete the reaction between the sodium isopropoxide and the oil. Thereafter the reaction mixture was given two successive washes with 40% by volume of water in each wash to remove sodium compounds. After each wash the mixture was allowed to settle and the water layer was withdrawn from the reactor. The oil was dried by blowing it at 225° F. with nitrogen for 30 minutes and then contacted at the same temperature for 30 minutes with adsorptive clay in amount of 5 lbs./bbl. Finally the mixture was pumped from the reactor through a filter to remove the clay.

The following is a comparison of certain of the properties of the oil treated as described above with the acid treated charge oil prior to treatment with the sodium isopropoxide.

|  | Acid Treated Charge | Alkoxide Treated Oil |
| --- | --- | --- |
| A.P.I. Gravity | 25.3 | 25.3 |
| Viscosity, S.U.S./100° F | 58.4 | 58.4 |
| Aromatics, wt. percent | 34.6 | 34.5 |
| Sulfur, wt. percent | 0.11 | 0.11 |
| Nitrogen, p.p.m | 4 | 1 |
| Continental Oxidation, hrs | 34 | 78 |

In the Doble PFVO Test the alkoxide treated oil had an initial power factor of about 0.5% and the power factor remained at about 0.5% throughout an oxidation period of 200 hours. This shows that the alkoxide treated oil was highly stable toward oxidation in the presence of copper. In comparison the power factor curve for the acid treated charge exhibited a small peak in the earlier stages of oxidation and thereafter rose sharply, with the power factor reaching a value of 10% at 48 hours.

Cupric oleate was then added to the alkoxide treated oil in amount to give a copper content of 25 p.p.m. and the mixture was vacuum distilled to remove 85% by volume of the oil overhead. Upon testing the distillate in the Doble PFVO Test it was found that the power factor rose sharply and continuously, reaching a value of about 10% in 25 hours. This indicates that the metal deactivating agent was retained in the residual fraction from the distillation.

The residual fraction was treated with a 6 N aqueous solution of HCl to extract the copper, washed with aqueous sodium bicarbonate followed by water and then dried. The copper-free residual oil was then blended with the distillate oil in the proportion of 15:85 and the mixture was tested in the Doble PFVO Test. It was found that the power factor curve was essentially the same as the alkoxide treated oil before distillation, remaining at about 0.5% during an oxidation period of 200 hours. This indicates that the HCl-treatment released the metal deactivating agent from its copper complex, converting it back to the form in which it was capable of providing protection against the pro-oxidative effects of copper.

*Example II*

Another portion of the oil which had been treated with sodium isopropoxide as described in Example I was used for making another batch of metal deactivator concentrate. Copper oleate was dissolved in the treated oil in amount such that the copper content was 25 p.p.m., and the mixture was distilled under vacuum to remove 92% of the oil overhead. The 8% bottoms fraction was treated with concentrated hydrochloric acid to remove the copper, and then was washed successively with aqueous sodium bicarbonate solution and with water and thereafter was dried. The resulting metal deactivator concentrate was blended with a commercial refrigerator oil in amount such that the concentrate content of the blend was 11% by volume. The refrigerator oil was an acid and clay treated naphthenic distillate having the following properties: A.P.I. gravity=23.5; viscosity=155 S.U.S. at 100° F.; aromatic content=33% by weight; ASTM pour point=−50° F. The Doble PFVO Test was run on the blend and the time required to reach a power factor of 10% was determined. For comparison similar PVFO tests were made on the refrigerator oil alone and also on a blend of the refrigerator oil with 11% of the acid and clay treated transformer oil described in Example I which had not been treated with sodium isopropoxide. The times required to reach a power factor of 10% were as follows:

| | Hours |
|---|---|
| Refrigerator oil alone | 53 |
| Blend of refrigerator and transformer oils | 53 |
| Blend of refrigerator oil and deactivator concentrate | 85 |

These results show that the metal deactivator concentrate prepared as described above substantially improved the oxidation stability of the refrigerator oil in the presence of copper.

When any other oil-soluble copper salt is substituted for cupric oleate, substantially equivalent results are obtained. Copper appears to be the only metal that is effective in concentrating the metal deactivating agent in the above-described procedure. For example, when either ferric oleate or cobalt oleate was substituted for cupric oleate in the procedure described above, the deactivating agent was not concentrated in the residual oil from the distillation step.

We claim:
1. Method of preparing a copper deactivator from hydrocarbon oil which comprises reacting a petroleum distillate oil boiling above 400° F. with alkali metal alkoxide formed from a metal selected from the group consisting of sodium, potassium and sodium-potassium alloys and an alcohol having 3–10 carbon atoms and selected from the group consisting of aliphatic and cycloaliphatic secondary and tertiary alcohols, whereby a compound capable of forming a complex with copper is formed in the oil, adding to the oil an oil-soluble copper salt of an organic acid, distilling the oil to remove a major portion thereof overhead, treating the residue oil from the distillation with aqueous mineral acid to remove copper therefrom, and separating the mineral acid from the resulting oil fraction containing a copper deactivator.

2. Method according to claim 1 wherein said alkoxide is sodium isopropoxide.

3. Method according to claim 1 wherein said alkoxide is sodium t-butoxide.

4. Method according to claim 1 wherein the amount of said copper salt added is such that the copper content of the oil is in the range of 10–100 p.p.m.

5. Method according to claim 1 wherein said petroleum distillate oil is treated with concentrated sulfuric acid and then with adsorptive clay prior to treatment with said alkoxide.

6. Method according to claim 1 wherein said distillate oil is a naphthenic distillate having a viscosity in the range of 50–65 S.U.S. at 100° F. and a viscosity-gravity constant in the range of 0.84–0.92.

7. Method of preparing a copper deactivator which comprises contacting at 175–400° F. a naphthenic petroleum distillate oil boiling mainly in the range of 550–700° F. with sodium alkoxide in which the alkoxide moiety corresponds to an alcohol having 3–10 carbon atoms and selected from the group consisting of aliphatic and cycloaliphatic secondary and tertiary alcohols, whereby a compound capable of forming a complex with copper is formed in the oil, adding to the oil an oil-soluble cupric salt of an organic acid in amount to provide a copper content in the oil of 10–100 p.p.m., distilling the oil to remove a major portion thereof overhead, treating the residue oil from the distillation with aqueous mineral acid to remove copper therefrom, and separating the mineral acid from the resulting oil fraction containing a copper deactivator.

8. Method according to claim 7 wherein said alkoxide is sodium isopropoxide and the amount thereof is equivalent to 0.1–5.0% sodium by weight based on said distillate oil.

9. Method according to claim 7 wherein said alkoxide is sodium t-butoxide and the amount thereof is equivalent to 0.1–5.0% sodium by weight based on said distillate oil.

References Cited by the Examiner
UNITED STATES PATENTS

| 2,166,503 | 7/39 | Milmore | 208—274 |
|---|---|---|---|
| 2,614,966 | 10/52 | Vanderbilt | 208—294 |
| 2,773,805 | 12/56 | Vanderbilt et al. | 208—273 |
| 3,152,069 | 10/64 | Wynkoop et al. | 208—286 XR |

FOREIGN PATENTS

| 526,863 | 9/40 | Great Britain. |
|---|---|---|

ALPHONSO D. SULLIVAN, *Primary Examiner.*